Oct. 18, 1949.    W. H. HICKOK    2,485,238
SURFACE FINISHING OF PLASTIC SHEETS
Filed Feb. 25, 1946
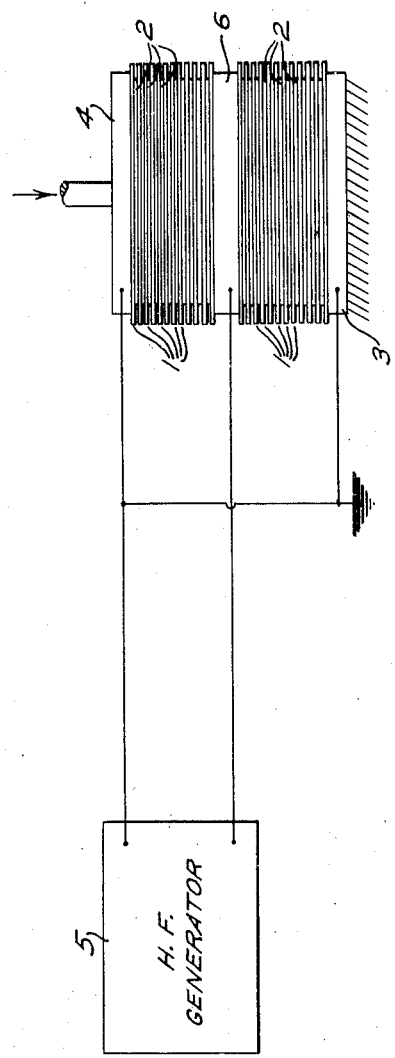
INVENTOR
WILLARD H. HICKOK
BY
Woodcock & Phelan
ATTORNEYS

UNITED STATES PATENT OFFICE 2,485,238

SURFACE FINISHING OF PLASTIC SHEETS

Willard H. Hickok, Louisville, Ky., assignor to The Girdler Corporation, Louisville, Ky., a corporation of Delaware Application February 25, 1946, Serial No. 650,093

6 Claims. (Cl. 18—56)

My invention relates to methods for obtaining a desired surface or finish on sheets consisting of or having external faces of "thermoplastic" material which term is for brevity herein used in broad sense to comprehend not only heat-softened materials which retain their thermoplasticity after initial heating but also other dielectric materials, including unpolymerized or partially polymerized thermosetting materials, which soften upon initial application of heat.

In accordance with my invention, the thermoplastic surface to which is to be imparted a polish or other desired surface texture is brought into face-to-face contact with a caul of dielectric material, for example, a thin sheet of paper impregnated with polymerized or thermoset phenol formaldehyde resin, and while the sheet and caul are under pressure, they are both heated by subjecting them to a high-frequency electrical field to a temperature at which the thermoplastic material softens into conformity with the surface of the caul sheet which is of dielectric material, preferably comprising a polymerized thermosetting material, which remains hard at that temperature.

More particularly, a plurality of thermoplastic sheets to be polished or otherwise finished are arranged in a stack in which the thin dielectric caul plates are interleaved. The generation of heat in the caul plates as well as in the thermoplastic sheets insures uniformity of temperature throughout the stack and avoids loss of heat which would occur were the usual metal caul plates employed.

My invention further resides in features hereinafter described and claimed.

For a more detailed understanding of my invention, reference is made to the accompanying drawing in which there is diagrammatically shown a system for polishing thermoplastic sheets.

Heretofore the general method of obtaining a highly polished surface on thermoplastic sheet material, such as, for example, polymerized vinyl chloride, polymerized mixtures or copolymers of vinyl chloride and vinyl acetate, polymerized methyl methacrylate and the like, has been to pile up the sheets with interposed highly polished metal caul plates to form a stack which is then disposed in a hot press. In such stacks the weight of the metal is materially in excess of the weight of the thermoplastic material being processed. For example, in the polishing of the surface of one hundred sheets of vinyl chloride-vinyl acetate copolymer having the dimensions 4' x 8' x .020", the customary procedure would be to use an approximately equal number of copper cauls each measuring 4' x 8' x .020". In such a stack there is about three tons of copper and only four hundred and fifty pounds of the thermoplastic sheets. Thus the great weight of the stack responsible for handling difficulties is preponderantly due to use of metal cauls.

Furthermore, when the stack is heated by disposition in a high-frequency electric field, the desired rise in temperature of the metal cauls must be obtained by transfer of heat from the thermoplastic sheets and since the major portion of the load consists of the caul sheets, the power consumption is not only high but to major extent is utilized in heating of the caul plates rather than the sheets being processed.

In the specific example above given, to raise the temperature of the stack 250° F. requires about 45,000 B. t. u.'s for the thermoplastic sheets and about 150,000 B. t. u.'s for the copper. All of this energy, 195,000 B. t. u.'s, must be generated in the thermoplastic sheets.

Moreover since heating of the cauls is effected by conduction from the thermoplastic sheets to the copper, the surfaces of the thermoplastic sheets are undesirably cooled whereas the prime purpose of the heating is to raise the temperature of those surfaces to the softening point. In fact because of this cooling the thermoplastic sheets may be overheated before their surfaces attain the required softening temperature.

In accordance with the present invention, instead of the metal cauls previously used in finishing the surfaces of thermoplastic sheets there are utilized highly polished sheets of paper impregnated with a polymerized thermosetting material such as phenol formaldehyde resin. For the purpose of direct comparison, it is assumed, in the specific example above, that the copper plates are replaced with paper laminate of the same thickness. In such case, instead of six thousand pounds of copper caul plates there would be used only eight hundred sixty-five pounds of resin impregnated paper caul plates thus greatly facilitating the handling of the stack.

Moreover, to raise the temperature of the paper cauls by 250° F., there is required only 65,000 B. t. u.'s instead of the 150,000 B. t. u.'s required for the copper cauls. Thus, the electrical energy required to heat the stack to a desired temperature is very materially less. Moreover, with the paper cauls, heat is generated in them when the stack is subjected to the high-frequency field so that the cauls are a source of heat rather than a source of heat absorption and they, therefore, contribute to the heating of the surface of the thermoplastic sheets.

It is not necessary that the laminate, the dielectric cauls, be as heavy as .040". They may be substantially thinner, for example, only .020" with still further reduction in weight of the stack to be handled and with still lower heat requirements to process a given number of thermoplastic sheets. For a typical operation for a given size of high-frequency generator, the following table may be referred to:

| Load [1] | Weight | B. t. u.'s | Per Cent Used | Minutes |
| --- | --- | --- | --- | --- |
| with copper cauls | 6,400 | 195,000 | 23 | 26 |
| with .040 laminate cauls | 1,315 | 110,000 | 41 | 15 |
| with .020 laminate cauls | 882 | 77,000 | 58 | 10 |

[1] (Work sheets comprising vinyl chloride-vinyl acetate copolymer).

Use of paper cauls is, of course, not limited to use in surface finishing of dielectric sheets of the specific thickness mentioned in the foregoing example; the sheets to be surface-finished may have a thickness greater or less than .040". Furthermore, the dielectric cauls need not be of the specific thicknesses above mentioned; in general, they should be as thin as possible consistent with mechanical considerations.

Preferably the composite stack of sheets 2 and paper cauls 1 is subdivided as shown in the figure of the drawing, with electrodes of opposite polarity distributed through the stack rather than a single pair of electrodes of opposite polarity disposed at opposite ends of the stacks. Specifically, in the particular arrangement shown, the bottom stationary electrode 3 and the upper movable electrode 4, to which pressure is applied, are connected to one terminal of the source of high frequency 5 whose other terminal is connected to electrode 6 disposed intermediate the ends of the stack. By this expedient, for reasons more fully disclosed in U. S. Letters Patent No. 2,307,344, the generation of heat in the thermoplastic sheets and in the cauls is more uniform throughout the stack.

The selection of an optimum frequency for the electric field used for dielectric heating of the thermoplastic sheets and of the cauls is based on now well established practice and should take into consideration such factors as the voltage difference between the heating electrodes, and the thickness and composition of the thermoplastic sheets and cauls.

Consistent with prior definition herein, the term "thermoplastic" material is intended to include those materials rendered plastic when heated in contact with the cauls, including thermosetting material in whole or in part in unpolymerized state. If the work sheets consist of or are surfaced with a true thermoplastic, the subsequent hardening for retention of the finish imparted by the cauls is effected by cooling of the work sheets. If on the other hand, the work sheets consist of or are surfaced with an unpolymerized or partially polymerized thermosetting material, the final hardening for permanent retention of the finish imparted by the cauls is accomplished by continued or further heating to complete polymerization.

It shall be understood that my invention is not limited to use of paper base caul sheets impregnated with phenol formaldehyde resin; the caul sheets may be of other base material such as fabric of cotton, glass, asbestos or the like and the impregnant therefor selected from other dielectric thermosetting resins, such as urea formaldehyde resin, melamine formaldehyde resin, phenol furfural resin or the like. Furthermore, it shall be understood that my invention is not limited to polishing of the thermoplastic sheets. If any other surface texture is desired, it is merely necessary that the cauls selected shall have such texture in order that the thermoplastic sheets may be pressed into conformity therewith while heated.

What I claim is:

1. The method of producing a desired surface on a thermoplastic sheet which comprises effecting face-to-face contact of said sheet with a caul consisting of dielectric material whose surface texture corresponds with that desired for said sheet and which remains so at elevated temperature at which said sheet is soft, subjecting the sheet and caul to a high-frequency electrical field to generate heat within both the sheet and caul to raise their temperatures to extent effecting softening of the thermoplastic, while said sheet is soft pressing it against the caul to impart to its surface the texture of the caul's, and thereafter separating the sheet from the caul.

2. The method of producing a desired surface on a thermoplastic sheet which comprises effecting face-to-face contact of said sheet with a caul consisting of dielectric material whose surface texture corresponds with that desired for said sheet and which remains so at elevated temperature at which said sheet is soft, while said sheet and caul are pressed together subjecting them to a high-frequency electrical field to generate heat within both the sheet and the caul cumulatively to cause the surface of the sheet to soften and conform with that of the caul, and thereafter separating the sheet from the caul.

3. The method of producing a desired surface on thermoplastic sheets which comprises stacking them with interleaved cauls consisting of thin sheet dielectric material and of surface texture which corresponds with that desired for said thermoplastic sheets, subjecting the stack to a high-frequency electrical field to generate within the thermoplastic sheets heat sufficient to soften them and to generate within the dielectric cauls heat insufficient to soften their surfaces yet effective to minimize cooling of the thermoplastic sheets by the cauls, while said thermoplastic sheets are soft applying pressure to the stack, and thereafter separating the sheets from the cauls.

4. The method of polishing thermoplastic sheets which comprises stacking them with interleaved cauls consisting of thin smooth sheets of dielectric material comprising a polymerized thermosetting resin, subjecting the stack while under pressure to a high-frequency field to generate within the thermoplastic sheets heat sufficient to soften their surfaces and to generate within the dielectric cauls heat insufficient to soften their surfaces yet effective to minimize cooling of the thermoplastic sheets by the cauls, and thereafter separating the sheets from the cauls.

5. The method of polishing thermoplastic sheets which comprises stacking them with interleaved cauls consisting of highly polished thin polymerized sheets of paper impregnated with a thermoset phenol formaldehyde resin, subjecting the stack while under pressure to a high-frequency field to generate heat within both the thermoplastic sheets and the cauls cumulatively to cause the surfaces of the thermoplastic sheets to soften into conformity with the surfaces of the cauls, and thereafter separating the sheets from the cauls.

6. The method of producing a desired surface on a thermoplastic sheet which comprises effecting face-to-face contact of the sheet with a caul consisting of dielectric material within which there will be generated heat by application of high-frequency energy thereto and whose surface texture corresponds with that desired for said thermoplastic sheet, said caul having a softening temperature above that at which said thermoplastic sheet softens, generating heat in said thermoplastic sheet by applying thereto a high-frequency electrical field, concurrently generating heat within said caul by application thereto of the same high-frequency electrical field, pressing the sheet and caul together while the associated face of said thermoplastic sheet is soft to impart to the said associated face the texture of the caul surface, and thereafter separating the sheet from the caul.

WILLARD H. HICKOK.

REFERENCES CITED

The following references are of record in the file of this patent:

UNITED STATES PATENTS

| Number | Name | Date |
|---|---|---|
| 1,806,846 | Fox et al. | May 26, 1931 |
| 1,986,637 | L'Hollier | Jan. 1, 1935 |
| 2,070,023 | Olsen | Feb. 9, 1937 |
| 2,215,244 | Linzell | Sept. 17, 1940 |
| 2,276,035 | Guhl | Mar. 10, 1942 |
| 2,307,344 | Zottus | Jan. 5, 1943 |
| 2,310,619 | Dillehay | Feb. 9, 1943 |